US011825943B2

United States Patent
Wei et al.

(10) Patent No.: US 11,825,943 B2
(45) Date of Patent: Nov. 28, 2023

(54) TELESCOPIC SLIDE RAIL SUPPORT PULLEY STRUCTURE

(71) Applicant: Nan Juen International Co., Ltd., Taoyuan (TW)

(72) Inventors: Xin-Hong Wei, Taoyuan (TW); Wei-Liang Liao, Taoyuan (TW); Ke-Yi Ku, Taoyuan (TW)

(73) Assignee: Nan Juen International Co., Ltd., Taoyuan (TW)

( * ) Notice: Subject to any disclaimer, the term of this patent is extended or adjusted under 35 U.S.C. 154(b) by 300 days.

(21) Appl. No.: 17/477,462

(22) Filed: Sep. 16, 2021

(65) Prior Publication Data

US 2022/0295987 A1 Sep. 22, 2022

(30) Foreign Application Priority Data

Mar. 22, 2021 (TW) .................................. 110110203

(51) Int. Cl.
*A47B 88/493* (2017.01)
*A47B 88/437* (2017.01)
*F16C 29/02* (2006.01)

(52) U.S. Cl.
CPC .......... *A47B 88/493* (2017.01); *A47B 88/437* (2017.01); *F16C 29/02* (2013.01); *A47B 2210/004* (2013.01); *A47B 2210/0008* (2013.01)

(58) Field of Classification Search
CPC ................ A47B 88/493; A47B 88/437; A47B 2210/0008; A47B 2210/004; F16C 29/02
See application file for complete search history.

(56) References Cited

U.S. PATENT DOCUMENTS

| | | | |
|---|---|---|---|
| 8,845,043 B2 * | 9/2014 | Bonat ................. | A47B 88/483 312/334.13 |
| 9,204,722 B2 * | 12/2015 | Violand .............. | A47B 88/437 |
| 10,165,858 B1 * | 1/2019 | Chen .................... | A47B 88/487 |
| 11,147,374 B2 * | 10/2021 | Meusburger ......... | F16C 29/048 |
| 2008/0303395 A1 * | 12/2008 | Chen .................... | A47B 88/493 312/334.8 |
| 2009/0238503 A1 * | 9/2009 | Liang .................. | A47B 88/493 384/18 |
| 2012/0049712 A1 * | 3/2012 | Lobbezoo ............ | A47B 88/493 384/51 |

(Continued)

FOREIGN PATENT DOCUMENTS

| | | | | |
|---|---|---|---|---|
| DE | 202014103864 U1 * | 12/2015 | ............. | A47B 88/40 |
| EP | 664983 A2 * | 8/1995 | ............. | A47B 88/10 |
| EP | 3058847 A1 * | 8/2016 | ............. | A47B 88/04 |

*Primary Examiner* — Daniel J Rohrhoff (57) ABSTRACT

A telescopic slide rail support pulley structure includes a first rail provided with multiple mounting holes and a first rolling carriage, a second rail include notch, a positioning hole and a second rolling carriage, a support pulley assembly provided with an upper roller, a lower roller, a support holder and a connecting portion, and a third rail. The connecting portion of the support pulley assembly is mounted to the notch of the second rail. The support pulley assembly also has an upper roller groove and a lower roller groove. The upper roller is arranged in the upper roller groove. The lower roller is arranged in the lower roller groove. The third rail is connected to the second rail through the second rolling carriage. The second rail is connected to the first rail through the first rolling carriage.

6 Claims, 8 Drawing Sheets

(56) References Cited

U.S. PATENT DOCUMENTS

| | | | |
|---|---|---|---|
| 2014/0241651 A1* | 8/2014 | Greussing | A47B 88/493 384/19 |
| 2015/0257536 A1* | 9/2015 | Chen | A47B 88/493 384/18 |
| 2022/0061529 A1* | 3/2022 | Prentner | A47B 88/493 |
| 2022/0330696 A1* | 10/2022 | Petker | A47B 88/493 |

* cited by examiner

TELESCOPIC SLIDE RAIL SUPPORT PULLEY STRUCTURE

BACKGROUND OF THE INVENTION

1. Field of the Invention

The present invention concerns a telescopic slide rail structure including a first rail be mounted on the side of the furniture by mounting hole portion, a second rail is mounted movably to the first rail, a third rail which is fixed to a drawer be mounted movably to the second rail, a support pulley assembly that is arranged to the notch of the second rail comprise at least one upper roller, at least one lower roller, a support holder, a support piece, a connecting portion, an upper roller groove, and a lower roller groove.

The invention further concerns a telescopic slide rail structure to improve the load-bearing capacity and prevent sagging of the slide rail to be described.

2. Description of the Related Art

U.S. Pat. No. 9,204,722 shows in FIG. 4 a drawer pull-out guide. In that case, wherein using the snap-action connector to fix the bearing on the rails between the central rail and drawer rail, and the bearing with supporting roller only support the drawer rail in the closed state.

The object of the present invention is to provide a telescopic slide rail structure referred to in the opening part of this specification while involving a more effective structure and function.

SUMMARY OF THE INVENTION

According to the invention, that object is attained by the features described below. Further advantageous configurations of the invention will also be described.

A telescopic slide rail support pulley structure comprises a first rail, a second rail, a support pulley assembly and a third rail.

The first rail comprises a plurality of mounting holes and at least one first rolling carriage supports the second rail.

The second rail comprises a notch, and at least one positioning hole, and at least one second rolling carriage supports the third rail, such that a second rail is movably mounted on the first rail.

The support pulley assembly comprises at least one upper roller, at least one lower roller, a support holder, a support piece, a connecting portion, an upper roller groove and a lower roller groove. The at least one upper roller is arranged in the upper roller groove. The at least one lower roller is arranged in the lower roller groove. The support piece is arranged on one side of the support holder. The connecting portion is connected to one end of the support holder and mounted to the notch of the second rail.

The third rail is connected to the second rail through the at least one second rolling carriage, the third rail can move relative to the second rail.

Preferably, when in the extended state, the lower part of the third rail abuts onto the at least one upper roller, where the at least one upper roller is a supporting point.

Preferably, the support piece converts vertical force to horizontal force for the second rail to absorb.

Preferably, when in the retrieved state, the lower part of the third rail is in contact with the at least one upper roller, and the at least one lower roller is in contact with the first rail, where the at least one upper roller and the at least one lower roller are both supporting points.

Preferably, the weight load from the drawer of the third rail is transmitted to the second rail through the at least one upper roller, and the weight load of the second rail is transmitted to the first rail through the at least one lower roller.

Preferably, the positioning protrusion is engaged with the positioning hole, and the support piece is against the second rail.

Preferably, the support pulley assembly further comprises an elastic arm and a positioning protrusion. The positioning protrusion is connected to the elastic arm. The elastic arm is connected to one end of the support holder.

In summary, the telescopic slide rail support pulley structure disclosed in the present invention can achieve the following effects:

1. Improve load-bearing capacity.
2. Prevent the third rail from sagging by a movable fulcrum.

Below by specific examples, it will be easier to understand the purpose, technical content, features and effects achieved by the present invention.

DETAILED DESCRIPTION OF THE PREFERRED EMBODIMENT

In order to solve the problem of insufficient load-bearing capacity, the inventor has gone through years of research and development to improve the criticism of existing products. The follow-up will introduce in detail how the present invention uses a telescopic slide rail support pulley structure to achieve the most efficient functional requirements.

Figure 1:
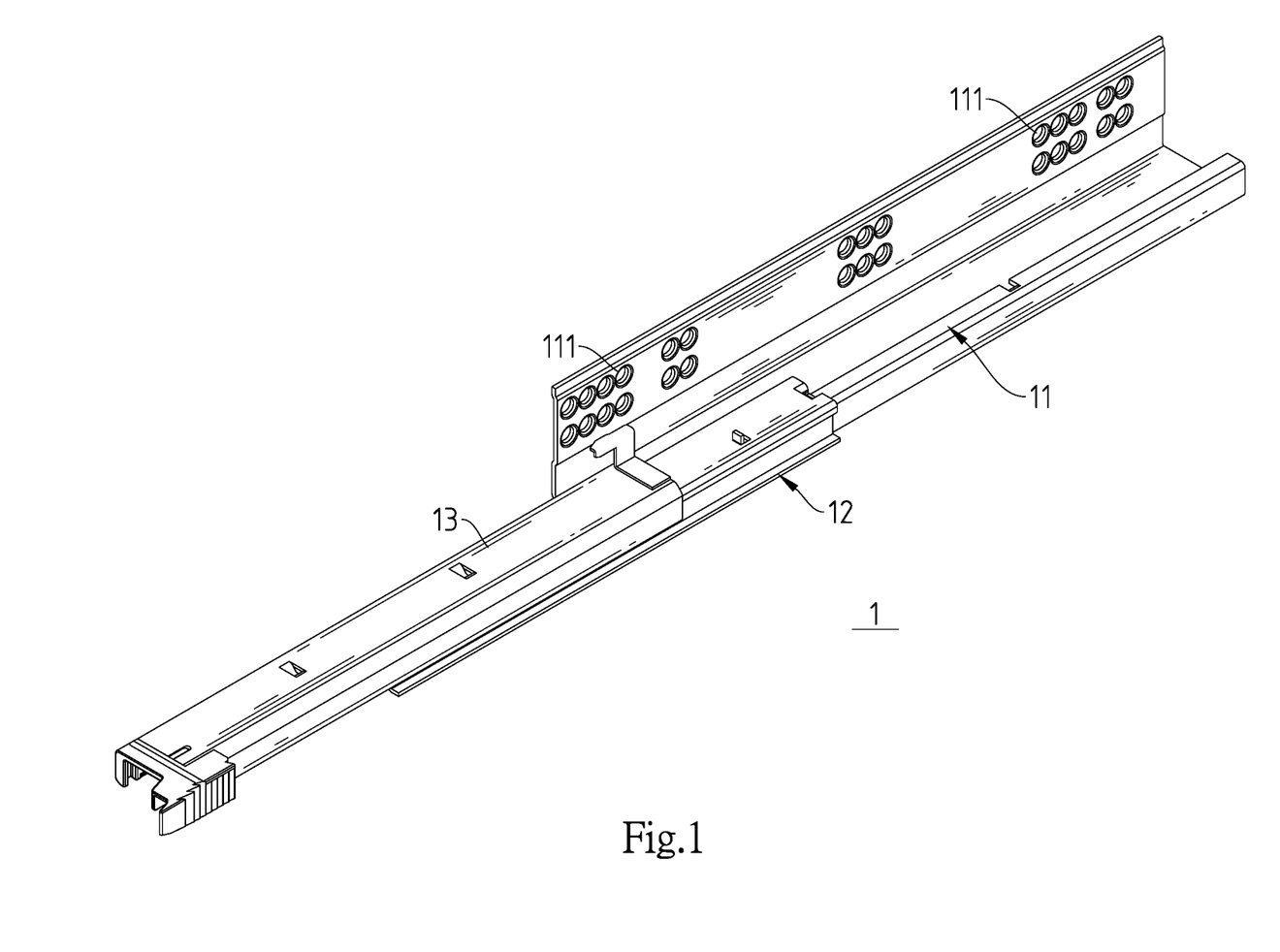
FIG. 1 shows a view of the telescopic slide rail support pulley structure of the present invention.
Figure 2:
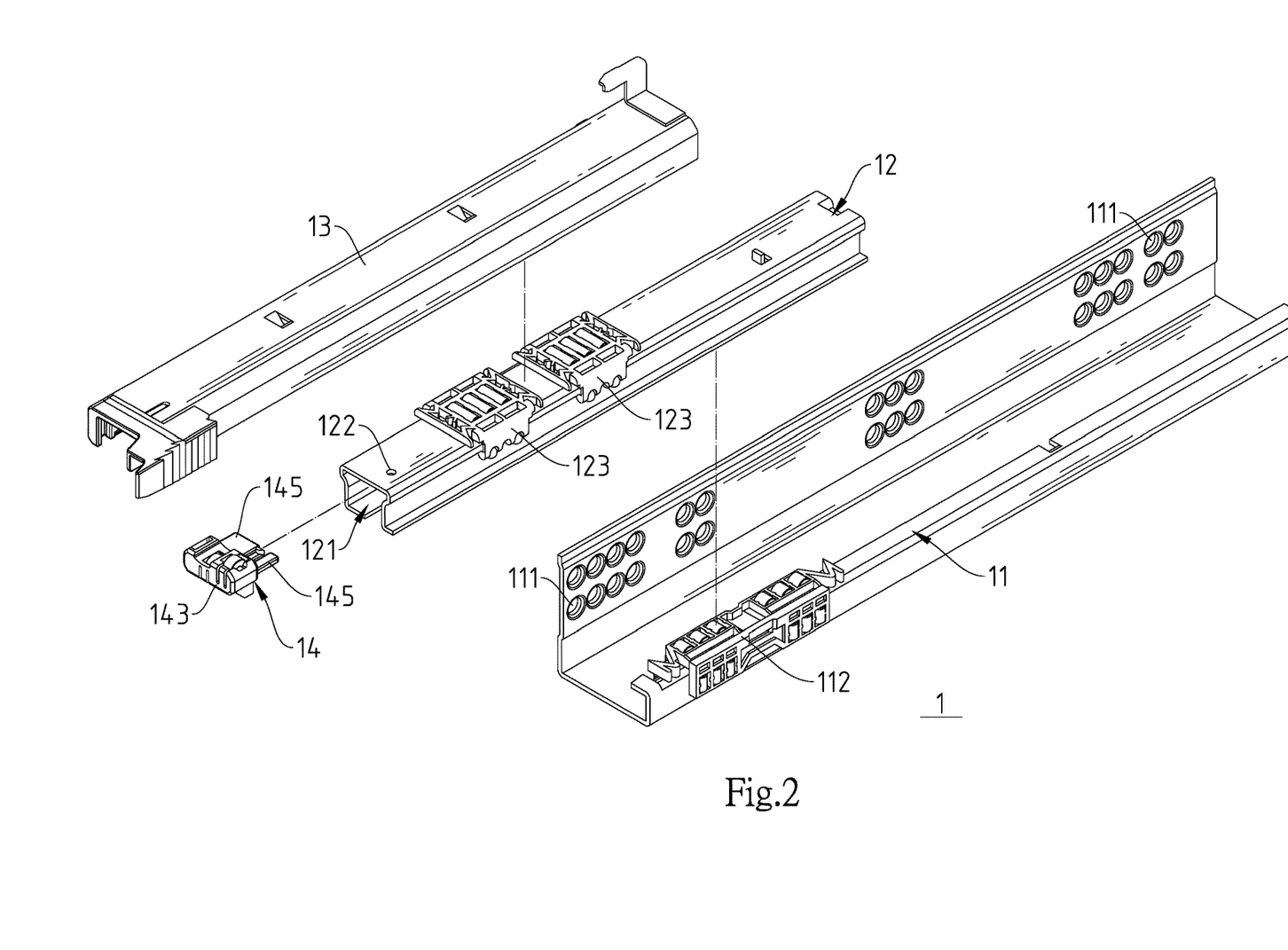
FIG. 2 is an exploded view of the telescopic slide rail support pulley structure of the present invention.
Figure 3:
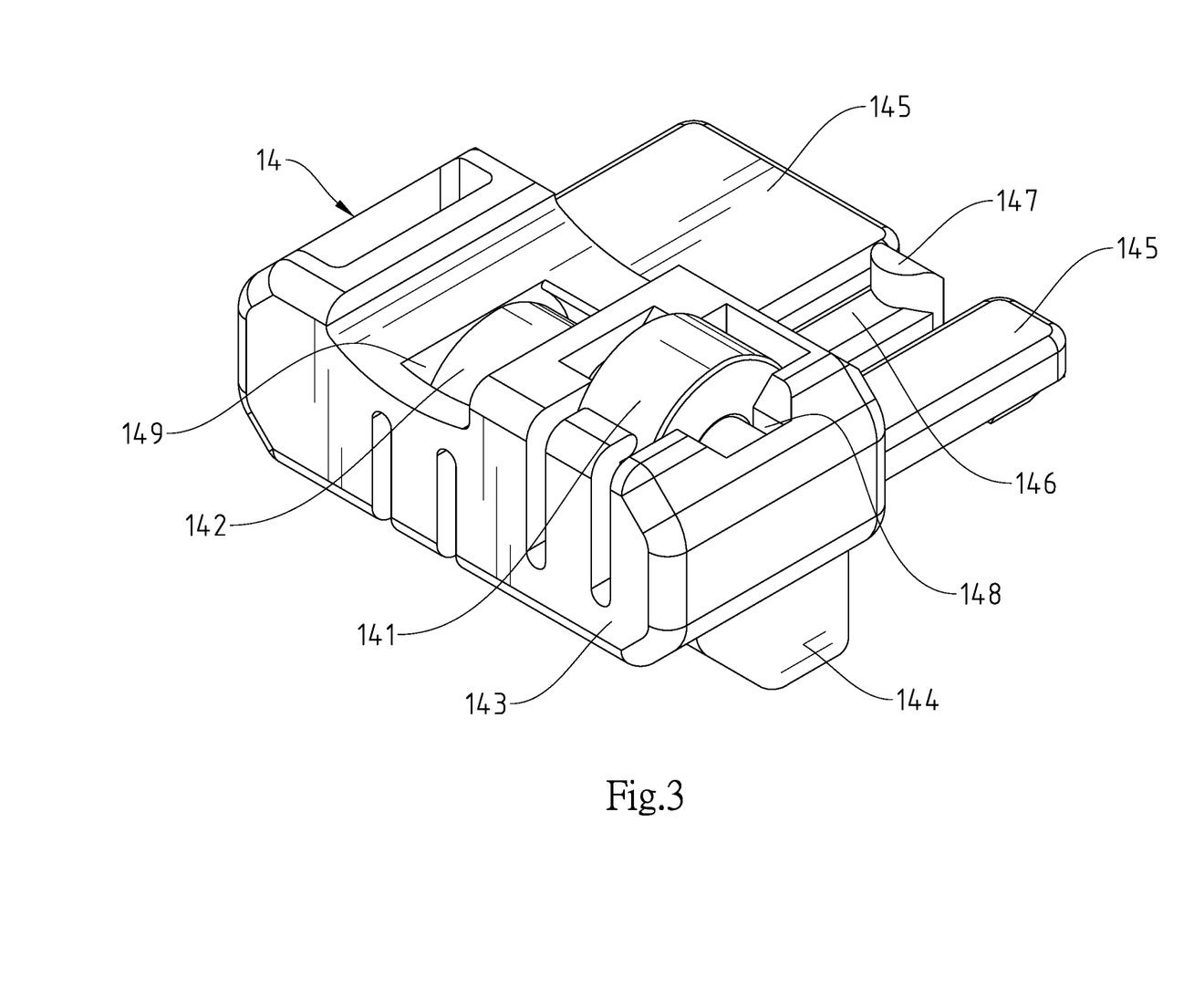
FIG. 3 shows a view of the support pulley assembly of the present invention.
Figure 4:
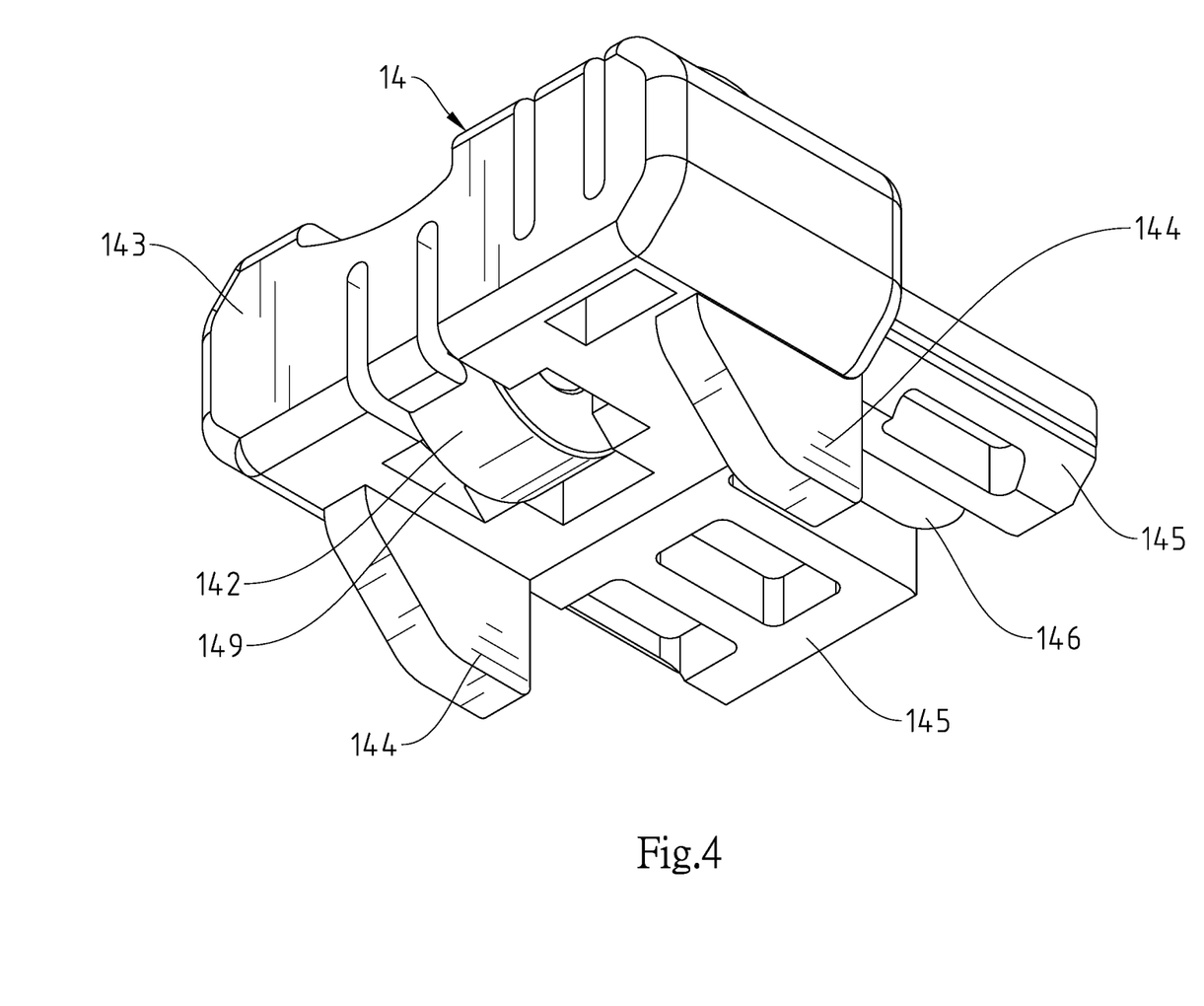
FIG. 4 is similar to FIG. 3 from another viewing angle.
Figure 5:
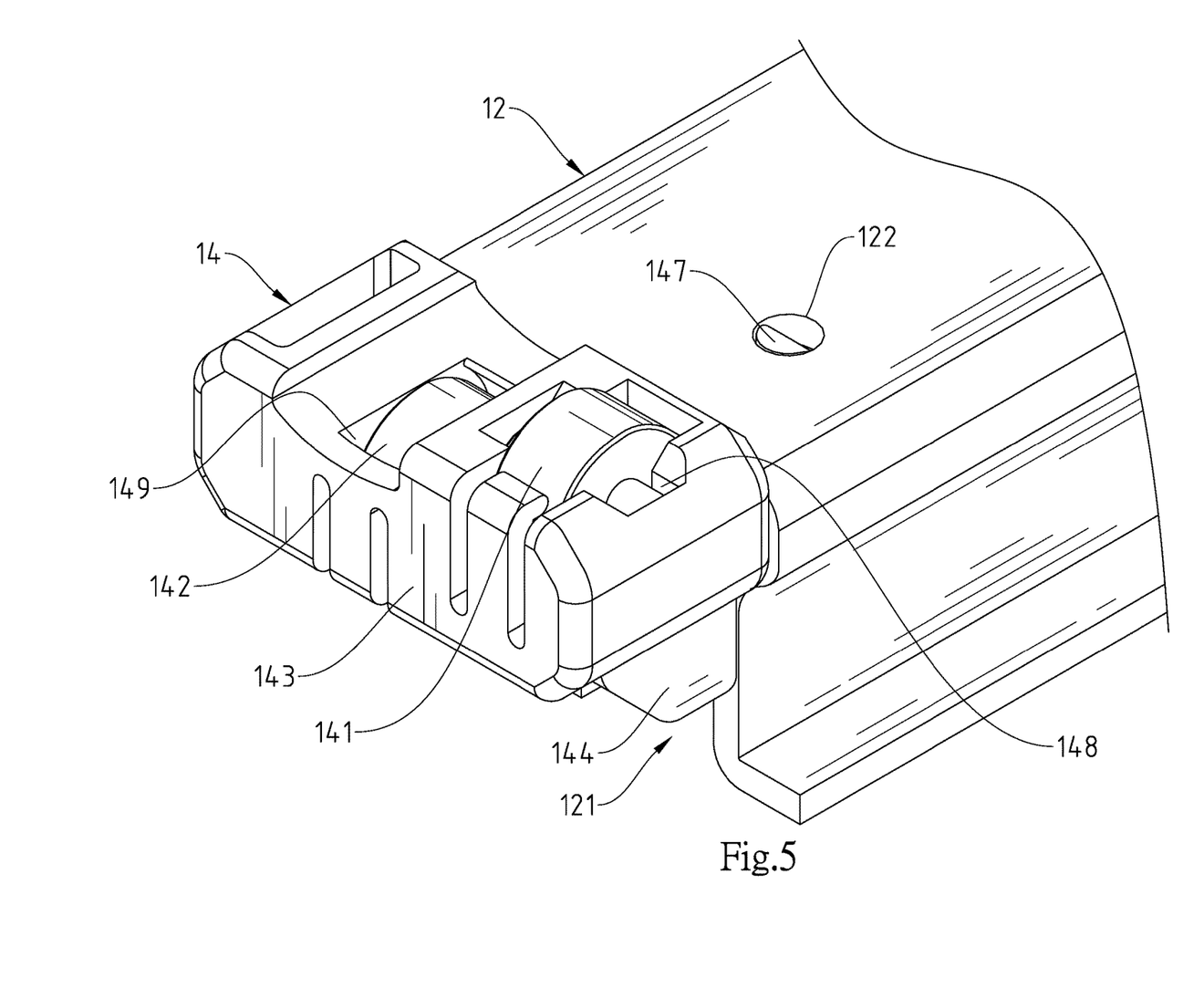
FIG. 5 is a view of the support pulley assembly combined with the second rail of the present invention.

Please refer to FIGS. 1 to 5, which are shows of the telescopic slide rail support pulley structure of the present invention, wherein FIG. 1 is a view of the telescopic slide rail support pulley structure of the present invention, FIG. 2 is an exploded view of the telescopic slide rail support pulley structure of the present invention, FIG. 3 is a view of the support pulley assembly of the present invention, FIG. 4 is similar to FIG. 3 from another viewing angle, and FIG. 5 is a view of the support pulley assembly combined with the second rail of the present invention. The telescopic slide rail support pulley structure 1 comprises a first rail 11, a second rail 12, a support pulley assembly 14 and a third rail 13. The first rail 11 comprises a plurality of mounting holes 111 and at least one first rolling carriage 112. The second rail 12 comprises a notch 121, at least one positioning hole 122 and at least one second rolling carriage 123. The third rail comprises a limit portion and a limit hole. The support pulley assembly 14 comprises at least one upper roller 141, a lower roller 142, a support holder 143, a support piece 144, a connecting portion 145, an elastic arm 146 and a positioning protrusion 147. The support pulley assembly 14 also comprises at least one upper roller groove 148 and a lower roller groove 149. In one embodiment, the telescopic slide rail support pulley structure of the present invention is applied to the extended or retrieved of a drawer, or in another implementation, the telescopic slide rail support pulley structure of the present invention can be combined with a storage space to open or close the storage space.

Regarding the combination of the telescopic slide rail support pulley structure of the present invention, the upper roller 141 is arranged on the upper roller groove 148, the lower roller 142 is arranged on the lower roller groove 149, the support piece 144 is arranged on the side of the support holder 143, and the connecting portion 145 is connected to one end of the support holder 143. The positioning protrusion 147 is connected to the elastic arm 146. The elastic arm 146 is connected to one end of the support holder 143. The third rail 13 will be connected to the second rail 12 through the second rolling carriage 123, and the second rail 12 will be connected to the first rail 11 through the first rolling carriage 112. The connecting portion 145 of the support pulley assembly 14 is pivotally connected to the notch 121 of the second rail 12. The positioning protrusion 147 is engaged with the positioning hole 122 and the support piece 144 is against the second rail 12. It is worth mentioning that the support pulley assembly 14 of the embodiment of the present invention can be flexibly installed or uninstalled on the second rail 12.

Figure 6:
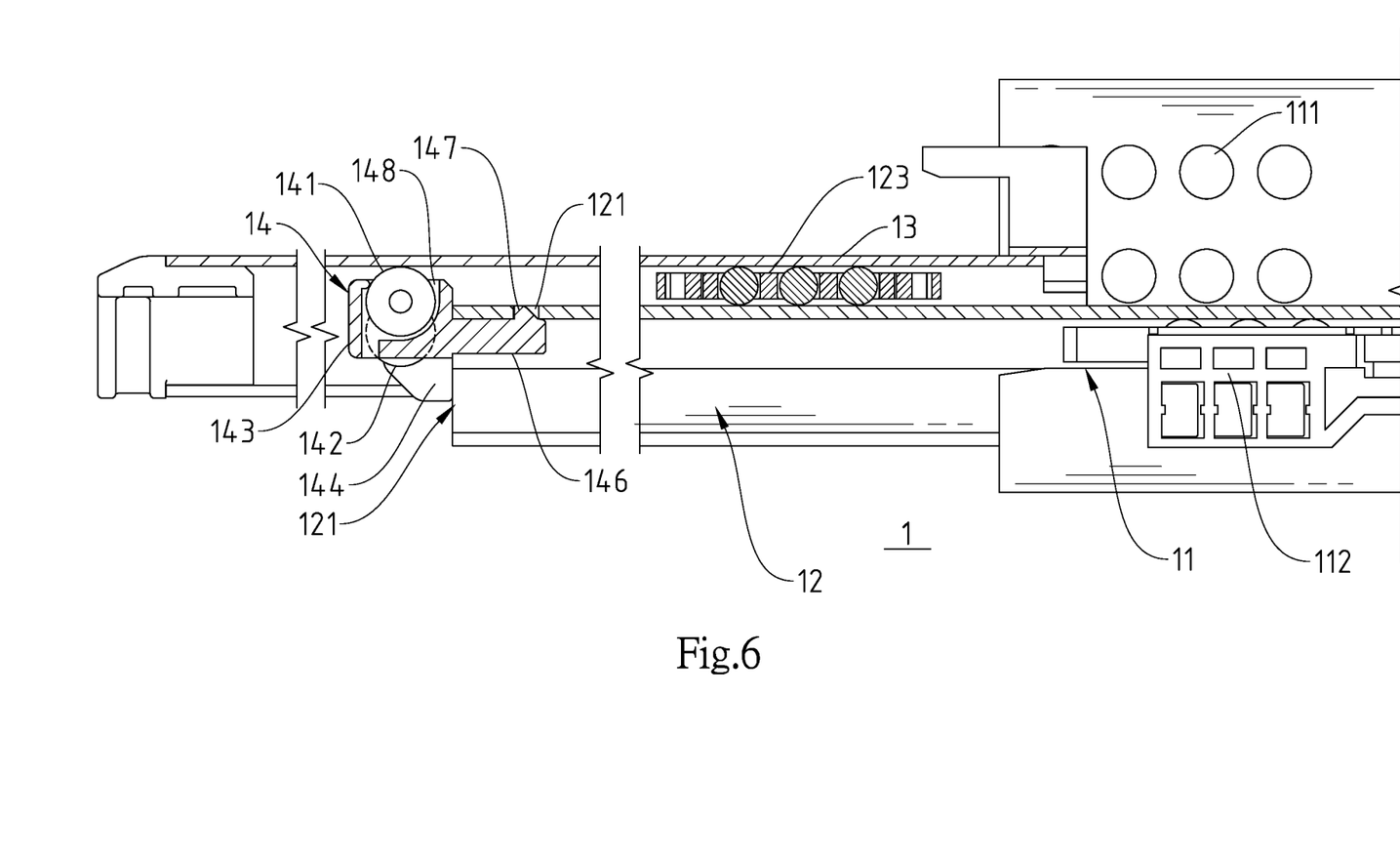
FIG. 6 is a schematic diagram of the extended state of the telescopic slide rail support pulley structure of the present invention.
Figure 7:
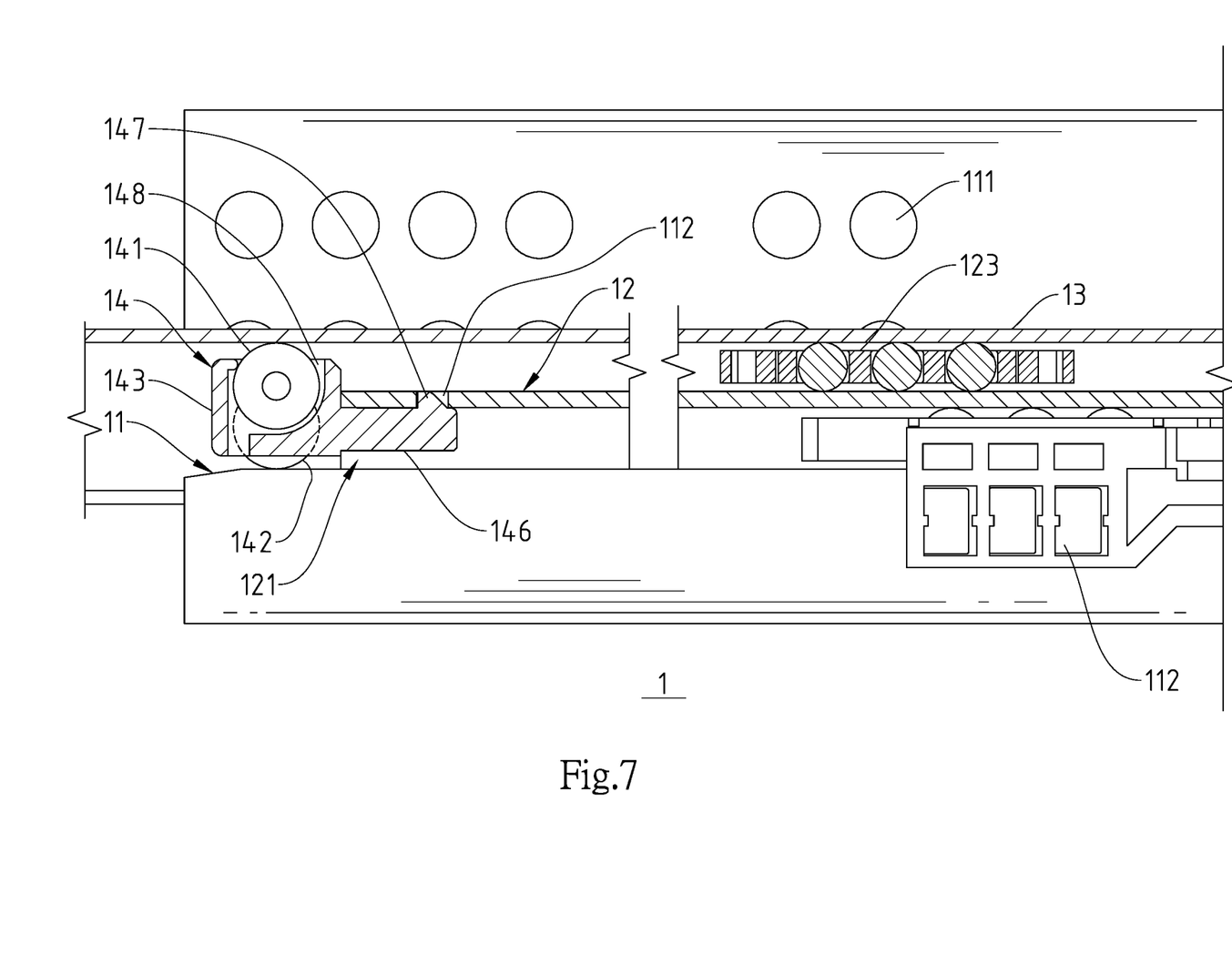
FIG. 7 is a schematic diagram of the retrieved state of the telescopic slide rail support pulley structure of the present invention.
Figure 8:
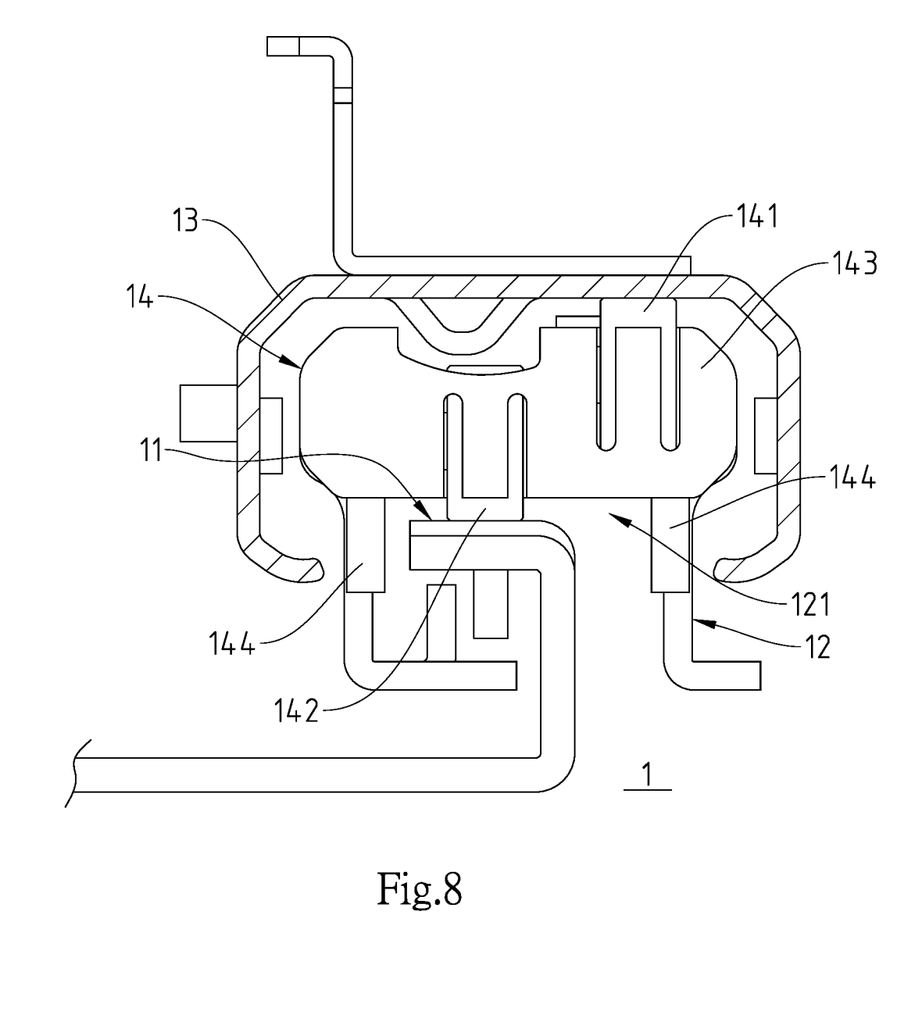
FIG. 8 is a schematic diagram of the retrieved state of the telescopic slide rail support pulley structure of the present invention from another view angle.

Please refer to FIGS. 6 to 8, wherein FIG. 6 is a schematic diagram of the extended state of the telescopic slide rail support pulley structure of the present invention, FIG. 7 is a schematic diagram of the retrieved state of the telescopic slide rail support pulley structure of the present invention, and FIG. 8 is a schematic diagram of the retrieved state of the telescopic slide rail support pulley structure of the present invention from another view angle. As shown in FIG. 6, when the telescopic slide rail support pulley structure 1 is in the extended state, the lower part of the third rail 13 is in contact with the upper roller 141. The upper roller 141 is the external support point (as shown in FIG. 6). This movable support point is moved outward to prevent the third rail 13 from sagging, thereby increasing the load-bearing capacity.

In addition, the support piece 144 can convert the longitudinal vertical force to the horizontal force for the second rail 12 to absorb (because the support piece 144 abuts onto the second rail 12, as shown in FIG. 5).

In addition, as shown in FIG. 7, when the telescopic slide rail support pulley structure 1 is in the retrieved state, the bottom of the third rail 13 is in contact with the upper roller 141 and the lower roller 142 is in contact with the first rail 11, wherein the upper roller 141 and the lower roller 142 are both supporting points, which can prevent the third rail and the second rail from sagging, and increase the load-bearing capacity.

The weight of the third rail 13 will be transmitted to the second rail 12 through the upper roller 141, and the weight of the second rail 12 will be transmitted to the first rail 11 through the lower roller 142. In this way, if the telescopic slide rail support pulley structure 1 is applied to a drawer, the load carried in the drawer can be transferred.

In summary, the telescopic slide rail support pulley structure disclosed in the present invention can achieve the following effects:

1. Improve load-bearing capacity.
2. Prevent the third rail from sagging by a movable fulcrum.

The above are only one preferred embodiment of the present invention, and are not used to limit the scope of implementation of the present invention. Therefore, all equivalent changes or modifications based on the features and spirit described in the scope of the application of the present invention should be included in the scope of the application of the present invention.

What the invention claimed is:

1. A telescopic slide rail support pulley structure, comprising:
   a first rail comprising a plurality of mounting holes and at least one first rolling carriage;
   a second rail comprising a notch and at least one positioning hole and at least one second rolling carriage, said second rail being movably mounted on said first rail;
   a support pulley assembly comprising at least one upper roller, at least one lower roller, a support holder, a support piece, a connecting portion, an upper roller groove and a lower roller groove, said at least one upper roller being arranged to said upper roller groove, said at least one lower roller being arranged to said lower roller groove, said support piece being arranged on one side of said support holder, said connecting portion being connected to one end of said support holder mounted to said notch of said second rail;
   a third rail movably mounted on said second rail, and wherein at least one second rolling carriage is arranged between the second rail and the third rail;
   wherein said at least one first rolling carriage is arranged between said first rail and said second rail; and
   wherein said support pulley assembly further comprises an elastic arm and a positioning protrusion, said positioning protrusion being connected to said elastic arm, said elastic arm being connected to one end of said support holder.

2. The telescopic slide rail support pulley structure as claimed in claim 1, wherein when in an extended state, a lower part of said third rail abuts onto said at least one upper roller, where said at least one upper roller is a supporting point.

3. The telescopic slide rail support pulley structure as claimed in claim 2, wherein said support piece converts vertical force to horizontal force for said second rail to absorb.

4. The telescopic slide rail support pulley structure as claimed in claim 1, wherein when in a retrieved state, a lower part of said third rail is in contact with said at least one upper roller and said at least one lower roller is in contact with said first rail, where said at least one upper roller and said at least one lower roller are both supporting points.

5. The telescopic slide rail support pulley structure as claimed in claim 4, wherein the weight of said third rail is transmitted to said second rail through said at least one upper roller, and the weight of said second rail is transmitted to said first rail through said at least one lower roller.

6. The telescopic slide rail support pulley structure as claimed in claim 1, wherein said positioning protrusion is engaged with said positioning hole, and said support piece is against said second rail.

\* \* \* \* \*